United States Patent
Kim et al.

(12) 
(10) Patent No.: US 11,166,784 B2
(45) Date of Patent: Nov. 9, 2021

(54) POWER GENERATING SYSTEM FOR A ROTATORY DENTAL APPARATUS

(71) Applicants: Yong Weon Kim, San Diego, CA (US); Chinpao Hsieh, Kaohsiung (TW)

(72) Inventors: Yong Weon Kim, San Diego, CA (US); Chinpao Hsieh, Kaohsiung (TW)

( * ) Notice: Subject to any disclaimer, the term of this patent is extended or adjusted under 35 U.S.C. 154(b) by 0 days.

(21) Appl. No.: 17/111,178

(22) Filed: Dec. 3, 2020

(65) Prior Publication Data
US 2021/0085429 A1 Mar. 25, 2021

Related U.S. Application Data

(60) Provisional application No. 63/092,975, filed on Oct. 16, 2020.

(51) Int. Cl.
*A61C 1/05* (2006.01)
*H02K 7/18* (2006.01)
*A61C 1/00* (2006.01)

(52) U.S. Cl.
CPC ............ *A61C 1/052* (2013.01); *A61C 1/0038* (2013.01); *H02K 7/1823* (2013.01)

(58) Field of Classification Search
CPC .... A61C 1/052; A61C 1/0038; H02K 7/1823; A61B 2018/00178
See application file for complete search history.

(56) References Cited

U.S. PATENT DOCUMENTS

| | | | | |
|---|---|---|---|---|
| 4,330,279 A | * | 5/1982 | Heil | A61C 1/052 433/126 |
| 4,600,384 A | * | 7/1986 | Olsen | A61C 1/052 433/126 |
| 2002/0127512 A1 | * | 9/2002 | Chen | A61C 17/20 433/119 |
| 2006/0121413 A1 | * | 6/2006 | Turner | A61C 1/181 433/114 |
| 2008/0145817 A1 | * | 6/2008 | Brennan | A61C 1/18 433/98 |
| 2016/0157959 A1 | * | 6/2016 | Rein | A61C 1/052 433/29 |

* cited by examiner

*Primary Examiner* — Heidi M Eide
*Assistant Examiner* — Drew S Folgmann
(74) *Attorney, Agent, or Firm* — Barry Choobin; Patent 360

(57) ABSTRACT

Disclosed is a power generating system for a rotatory dental apparatus that can power the illumination source. The rotatory dental apparatus includes a supply hose having a hose connector at its one end. A swivel coupling connects the hose connector to the dental handpiece. The power generating system can be configured in the hose supply. In one case, the power generating system can be installed in the hose connector of the hose supply. In one case, the power generating system can be interposed between the two sections of the hose supply. In one case, the power generating system can be installed in a hose coupling that is interposed between the swivel coupling and the hose connector.

10 Claims, 4 Drawing Sheets

POWER GENERATING SYSTEM FOR A ROTATORY DENTAL APPARATUS

CROSS-REFERENCE TO RELATED APPLICATIONS

This application claims priority to the U.S. provisional patent application Ser. No. 63/092,975, filed on Oct. 16, 2020 which is incorporated herein by reference in its entirety.

FIELD OF INVENTION

The present invention is directed to a power generating system, and more particularly, the present invention relates to a power generating system for a dental hose that powers an illumination source downstream of the power generating system.

BACKGROUND

In modern dentistry, a lighting system is often integrated with a rotatory dental tool, hereafter called dental handpiece, so that dentists can see the working area illuminated inside a patient's mouth from a light source attached to the handpiece. The conventional way of delivering power to such light source involves electrical power supply and controller, electrical wires inside the air/water servicing hose, and fiber optic bundle inside the handpiece body.

More recently, an air-driven miniature generator unit is utilized to power a light source integrated with a dental handpiece. Such an air-driven generator unit is embedded either inside the dental handpiece body or inside a swivel coupling interposed between the dental handpiece and air/water servicing hose connector. Both the handpiece and the swivel coupling must be sterilized before every application. Generally, the handpiece and the swivel coupling are autoclaved at high temperatures. The high temperatures of autoclaving decrease the life of the generator.

Thus, a need is appreciated for an alternate system that can power the lighting source in the handpiece. A need is appreciated for a power generating system that need not install in the handpiece or swivel coupling.

SUMMARY OF THE INVENTION

The principal object of the present invention is therefore directed to a power generating system for a rotatory dental apparatus.

It is another object of the present invention that the power generating system has a long life.

It is still another object of the present invention that the power generating system is not installed in the dental handpiece or swivel coupling.

It is a further object of the present invention that the power generating system is economical to manufacture.

In one aspect, disclosed is a power generating system that provides an alternative way of delivering electrical power to a handpiece light source.

In one aspect, the disclosed power generating system can be configured in a hose coupling that is interposed between the swivel coupling and the hose connector.

In one aspect, the power generating system can be configured in the hose connector.

In one aspect, the power generating system can be interposed between two sections of the hose supply of the rotatory dental apparatus.

In one aspect, the power generating system can be a fluid driven generator, wherein the fluid can be liquid or air.

These and other objects and advantages of the embodiments herein will become readily apparent from the following detailed description.

BRIEF DESCRIPTION OF DRAWINGS

The accompanying figures, which are incorporated herein, form part of the specification and illustrate embodiments of the present invention. Together with the description, the figures further explain the principles of the present invention and to enable a person skilled in the relevant arts to make and use the invention.

DETAILED DESCRIPTION

Subject matter will now be described more fully hereinafter. Subject matter may, however, be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, the subject matter may be embodied as assembly and methods of use thereof. The following detailed description is, therefore, not intended to be taken in a limiting sense.

The word "exemplary" is used herein to mean "serving as an example, instance, or illustration." Any embodiment described herein as "exemplary" is not necessarily to be construed as preferred or advantageous over other embodiments. Likewise, the term "embodiments of the present invention" does not require that all embodiments of the invention include the discussed feature, advantage, or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

The following detailed description includes the best currently contemplated mode or modes of carrying out exemplary embodiments of the invention. The description is not to be taken in a limiting sense but is made merely for the purpose of illustrating the general principles of the invention, since the scope of the invention will be best defined by the allowed claims of any resulting patent.

Figure 1:
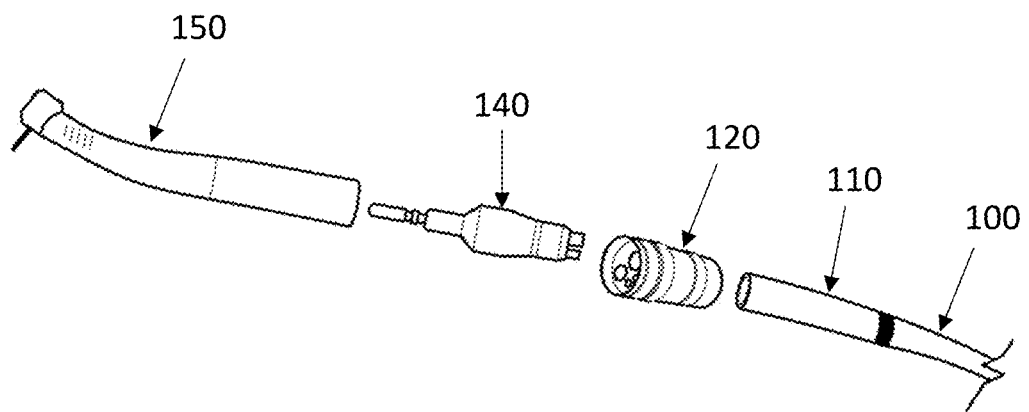
FIG. 1 shows an exemplary embodiment of the rotatory dental apparatus having the handpiece, swivel coupling, hose coupling, and the hose supply, according to the present invention.

Referring to FIG. 1 describes an exemplary embodiment of the disclosed power generating system for a rotatory dental apparatus. The power generating system can power a lightning source of a handheld dental handpiece. FIG. 1 shows a rotatory dental apparatus that includes a supply hose 100 having a hose connector 110 at one end and a fluid supply coupled to the other end (not shown) of the supply hose. The hose coupling 120 includes the disclosed power generation system, wherein the hose coupling can be interposed between the hose connector 110 and a swivel coupling 140. The structure and functioning of swivel coupling are known to a skilled person. Lastly, FIG. 1 shows a dental handpiece 150 that can be connected to the swivel coupling 140. The dental handpiece can be driven by the flow of compressed fluid, for example, drive air, that is supplied through the supply hose 110 and the swivel coupling 140. The power generating system includes a turbine mechanically coupled to an electrical generator to generate the electric current, wherein the turbine can be in line with the compressed fluid supply or the exhaust fluid supply from the handpiece and driven by it. The supply hose can be a multichannel hose that may include one or more of a water tube, chip air tube, drive air tube, and exhaust air tube. The water from the water tube can be used to protect the handpiece. The air from the chip air tube can be used to atomize the water flowing from the water tube. The drive air tube can supply the compressed air to drive the rotatory mechanism of the handpiece. The exhaust tube returns the exhausted drive air. There are no optic fibers or the electrical cables inside the supply hose.

Figure 2:
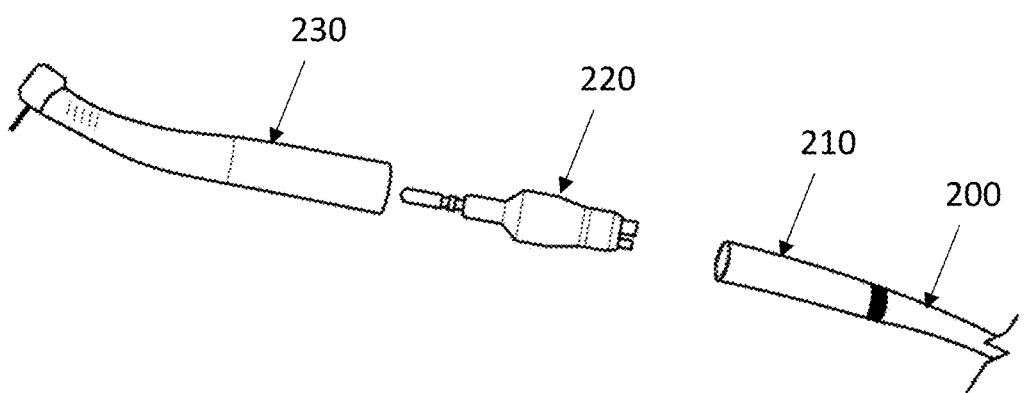
FIG. 2 shows another exemplary embodiment of the rotatory dental apparatus having the handpiece, swivel coupling, and the hose supply, the hose supply having the hose connector, according to the present invention.

Referring to FIG. 2, which shows another exemplary embodiment of the present invention. The disclosed power generating system can be configured in a hose connector. FIG. 2 shows a rotatory dental apparatus that includes a supply hose 200 having a hose connector 210 at its one end and its other end (not shown) can be fluidly connected to a compressed fluid supply. A swivel coupling 220 connects the hose connector to the dental handpiece 230. The dental handpiece can be driven by the flow of compressed fluid, for example, drive air, that is supplied through the supply hose and the swivel coupling. The power generating system includes a turbine that can be in line with the compressed fluid supply to the handpiece or the exhaust fluid supply from the handpiece, wherein the turbine can be driven by the compressed fluid supply or the exhaust fluid supply, as the case may be.

Figure 3:
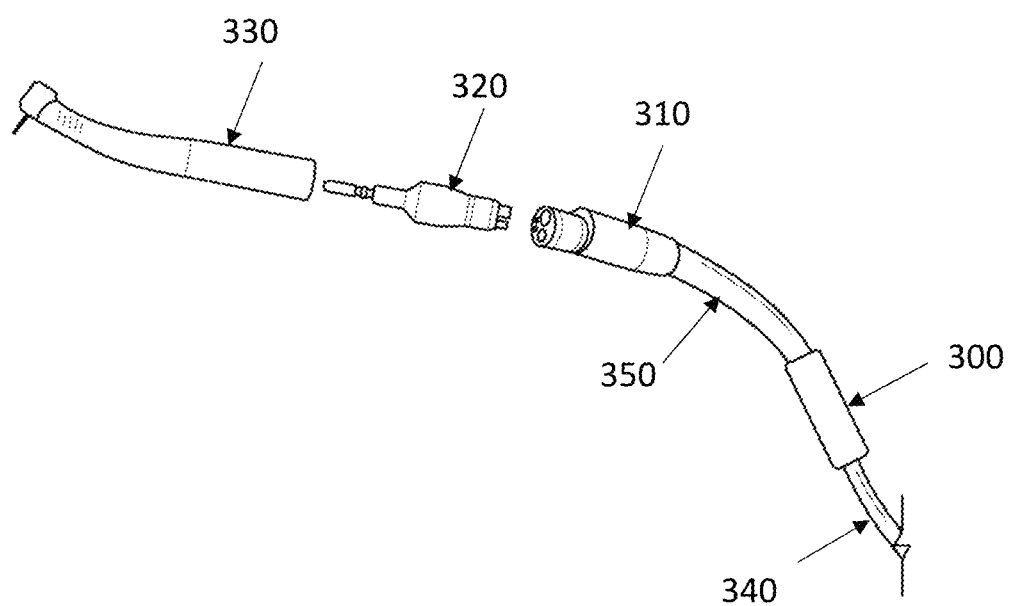
FIG. 3 shows another exemplary embodiment of the rotatory dental apparatus having the handpiece, swivel coupling, and the hose supply, the hose supply having the hose connector and power generating system, according to the present invention.

Referring to FIG. 3, which shows another exemplary embodiment of the present invention. The disclosed power generating system 300 can be configured in a hose supply of rotatory dental apparatus. FIG. 3 shows a rotatory dental apparatus that includes a supply hose having a hose connector 310 at its one end and its other end (not shown) can be fluidly connected to a compressed fluid supply. A swivel coupling 320 connects the hose connector to the dental handpiece 330. The dental handpiece can be driven by the flow of compressed fluid, for example, drive air, that is supplied through the supply hose and the swivel coupling 320. The disclosed power generating system can be interposed between two sections of the supply hose. FIG. 3 shows the supply hose having a first section 340 and a second section 350, and the power generating system can be interposed between the first section 340 and the second section 350. The power generating system includes a turbine that can be in line with the compressed fluid supply to the handpiece or the exhaust fluid supply from the handpiece, wherein the turbine can be driven by the compressed fluid supply or the exhaust fluid supply, as the case may be.

Figure 4:
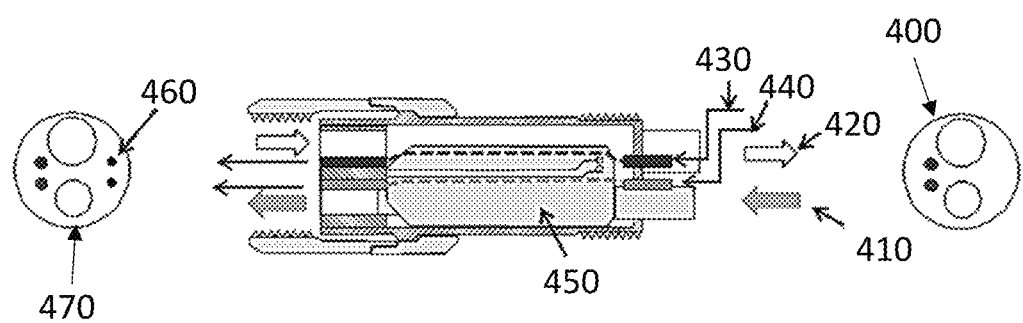
FIG. 4 shows an exemplary embodiment of the power generating system, according to an exemplary embodiment of the present invention.

Referring to FIG. 4 which shows a sectional view of an exemplary embodiment of the power generating system for 4-hole or 6-hole hose coupling generator driven by "drive-air". The disclosed power generating system in FIG. 4 is of a 4-hole elongated configuration having a proximal end and a distal end. The disclosed power generating system can be connected to a 4-hole hose connector 400 with no electrodes. The disclosed system can include four flow circuit elements including drive air channel 410, exhaust air channel 420, chip air channel 430, water channel 440, air-driven generator 450. The swivel coupling 470 can include electrode pins 460. There are four flow circuit elements including the drive air channel 410, exhaust air channel 420, chip air channel 430, and the water channel 440. The air-driven generator 450 is in line with the drive air channel 410 and can be driven by the drive air. The drive air also drives the functional element of the handpiece. The generator 450 generates the power which can be connected through the electrodes 460 to the illumination source. The illumination source can be located in the swivel coupling or the handpiece.

Figure 5:
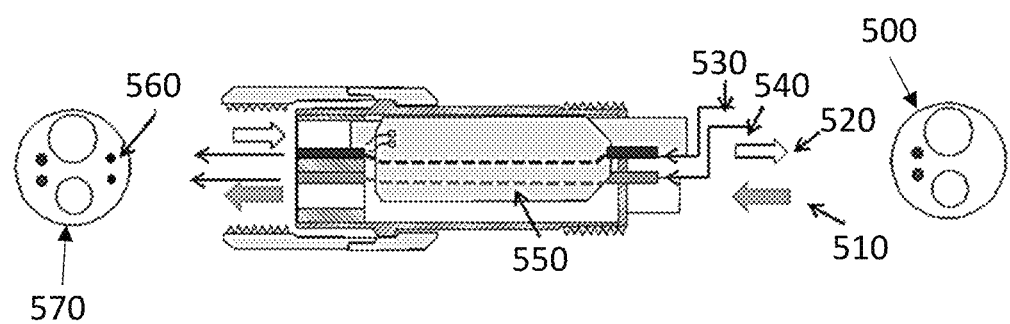
FIG. 5 shows another exemplary embodiment of the power generating system, according to an exemplary embodiment of the present invention.

FIG. 5 shows the power generating system that is like the power generating system of FIG. 4 except the turbine is in line with the exhaust air channel and driven by the exhaust channel. FIG. 5 shows the hose 500 having four channels and no electrodes. On the opposite side of the power generating system is the swivel coupling 570, also having four channels and two electrodes. The four channels of the hose 500 and the four channels of the swivel coupling are fluidly connected through the disclosed power generating system which also has the four channels. The four channels of the power generating system include the drive air channel 510, exhaust air channel 520, chip air channel 530, water channel 540. The air-driven turbine generator 550 is in line with the exhaust air channel 520 and driven by the exhaust air. The drive air through the drive air channel 510 drives the rotatory mechanism of the handpiece, and the exhaust air from the handpiece can return through the exhaust air channel 520. The turbine is driven by exhaust air. The generator electrically connects to the illumination source through the electrode pins 560. The illumination source can be installed in the swivel coupling or the handpiece. When the illumination source is installed in the handpiece, an optical fiber can connect the illumination source to the handpiece. Also, it is to be understood that that FIG. 5 shows the supply hose 500 and the swivel coupling 570, the supply hose 500 can be a hose connector or a section of a hose, Similarly, the element 570 can be another hose section.

Figure 6:
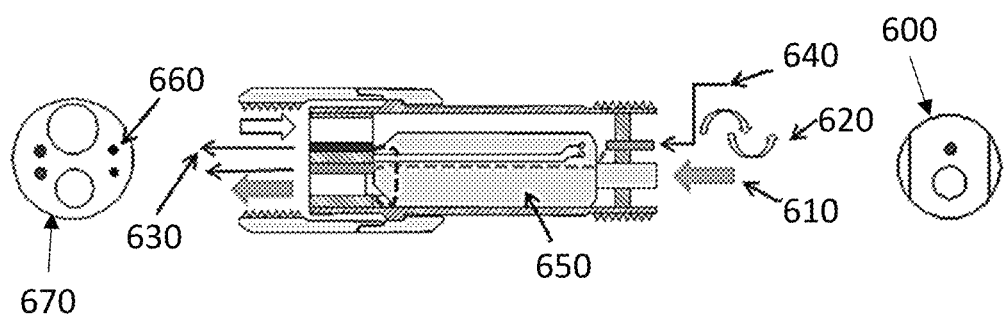
FIG. 6 shows another exemplary embodiment of the power generating system, according to an exemplary embodiment of the present invention.

FIG. 6 shows an exemplary embodiment of the 2-hole to 6-hole hose coupling generator driven by "drive air". The hose 600 shown in FIG. 6 includes one channel for the drive air and one water channel. The proximal end of the disclosed power generating system can be connected to the drive air tube and the water tube of the supply hose. The power generating system includes a turbine generator 650 that is in line with the drive air channel 610 and driven by the drive air. The power generating system includes four channels, the four channels including the drive air channel 610, the exhaust air channel 620, the chip air channel 630, and the water channel 640. The drive air channel 610 and the water channel 640 are in fluid communication with the two channels of the hose supply. The swivel coupling 670 includes the four channels in fluid communication with the four channels of the power generating system. The swivel coupling also includes two electrodes that can electrically connect to the electrical generator 650. Since, there is no chip air channel in the hose, the drive air channel 610 of the power generating system can be branched and fluidly connected with the chip air channel 630.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above-described embodiment, method, and examples, but by all embodiments and methods within the scope and spirit of the invention as claimed.

What is claimed is:

1. An apparatus for a rotatory dental apparatus comprising:
    a hose coupling having a proximal end and a distal end;
    a swivel coupling removably and fluidly connecting the proximal end of the hose coupling to a handpiece;
    a supply hose having a hose connector at its one end, the hose connector removably and fluidly coupled to the distal end of the hose coupling; and
    a power generating system configured in the hose coupling, the power generating system further comprises a turbine operably coupled to an electrical generator, wherein the turbine drives the electrical generator for generating electricity, the power generating system comprises a water channel, a drive air channel, an exhaust air channel, and a chip air channel, the drive air channel in fluid communication with a drive air tube of the supply hose,
    wherein the turbine is in-line with the exhaust air channel, wherein the turbine is driven by exhaust air returned by the exhaust air channel.

2. The apparatus according to claim 1, wherein the drive air channel is in fluid communication with the chip air channel.

3. The apparatus according to claim 1, wherein the supply hose does not have optical fibers.

4. The apparatus according to claim 1, wherein the swivel coupling comprises a pair of electrodes configured to electrically connect the electrical generator to an illumination source in the handpiece.

5. The apparatus according to claim 1, wherein the swivel coupling comprises a pair of electrodes configured to electrically connect to the electrical generator.

6. The apparatus according to claim 1, wherein the swivel coupling comprises an illumination source, the illumination source connected to a pair of electrodes, an optical fiber connects the illumination source to the handpiece.

7. An apparatus for a rotatory dental apparatus comprising:
    a supply hose having a hose connector at its one end; and
    a power generating system configured in the hose connector, the power generating system further comprises a turbine operably coupled to an electrical generator, wherein the turbine drives the electrical generator for generating electricity, the power generating system comprises a water channel, a drive air channel, an exhaust air channel, and a chip air channel, the drive air channel in fluid communication with a drive air tube of the supply hose,
    a swivel coupling configured to fluidly connect the hose connector to the rotatory dental apparatus, the swivel coupling comprises a pair of electrodes in electrical communication with the electrical generator,
    wherein the turbine is in-line with the exhaust air channel, wherein the turbine is driven by exhaust air returned by the exhaust air channel.

8. The apparatus according to claim 7, wherein the drive air channel is in fluid communication with the chip air channel.

9. An apparatus for a rotatory dental apparatus comprising:
    a supply hose having a first section and a second section, the first section having a proximal end and a distal end, the second section having a proximal end and a distal end, a hose connector coupled to the proximal end of the second section; and
    a power generating system interposed between the proximal end of the first section and the distal end of the second section of the supply hose, the power generating system comprises a turbine operably coupled to an electrical generator, wherein the turbine drives the electrical generator for generating electricity, the power generating system comprises a water channel, a drive air channel, an exhaust air channel, and a chip air channel;
    a swivel coupling configured to fluidly connect the hose connector to the rotatory dental apparatus, the swivel coupling comprises a pair of electrodes in electrical communication with the electrical generator,
    wherein the turbine is in-line with the exhaust air channel, wherein the turbine is driven by exhaust air returned by the exhaust air channel.

10. The apparatus according to claim 9, wherein the drive air channel is in fluid communication with the chip air channel.

* * * * *